June 4, 1935.    M. R. McDANAL    2,004,005
MOUNTING FOR RIMLESS SPECTACLES AND EYEGLASSES
Filed March 6, 1934    2 Sheets-Sheet 1
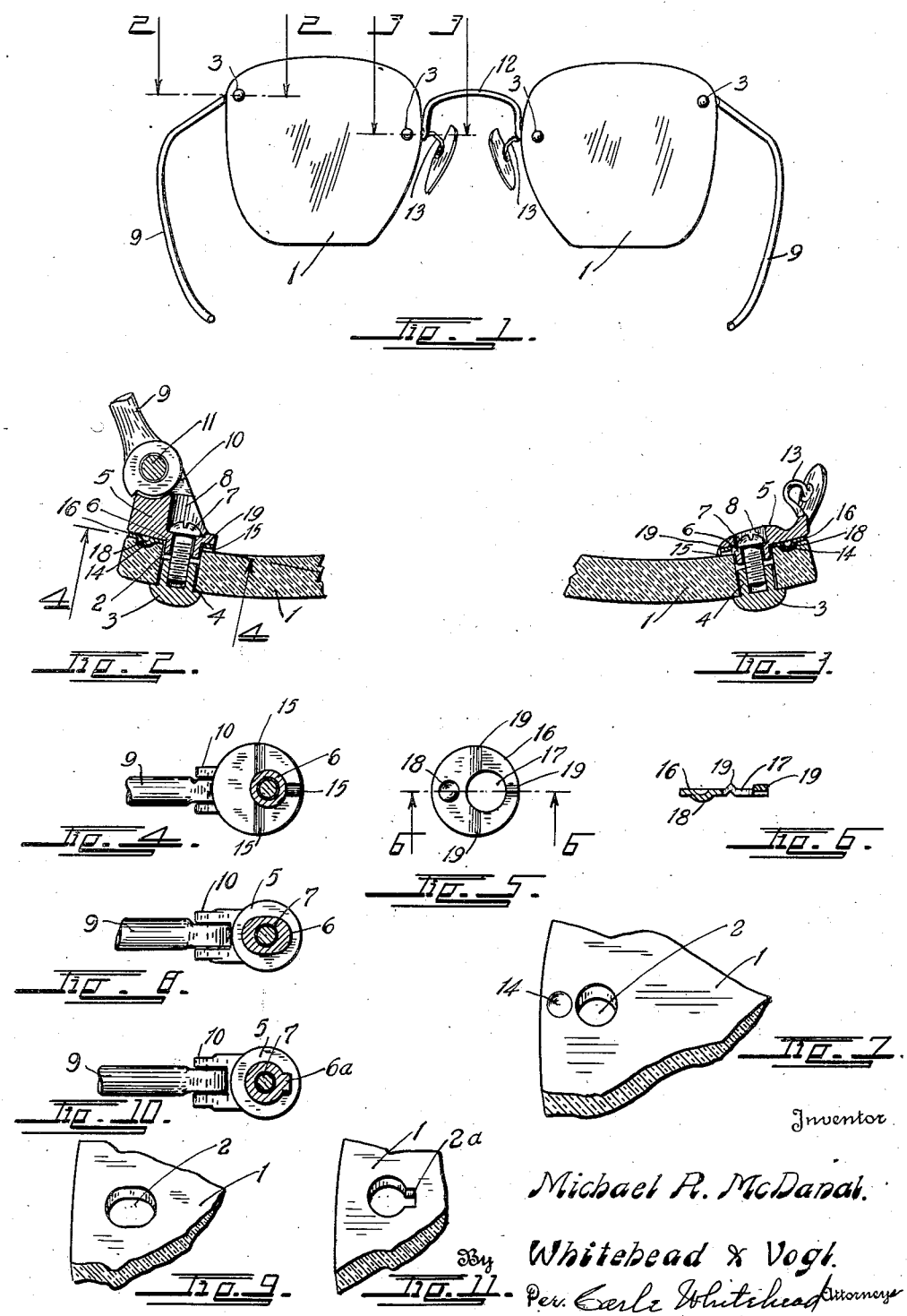

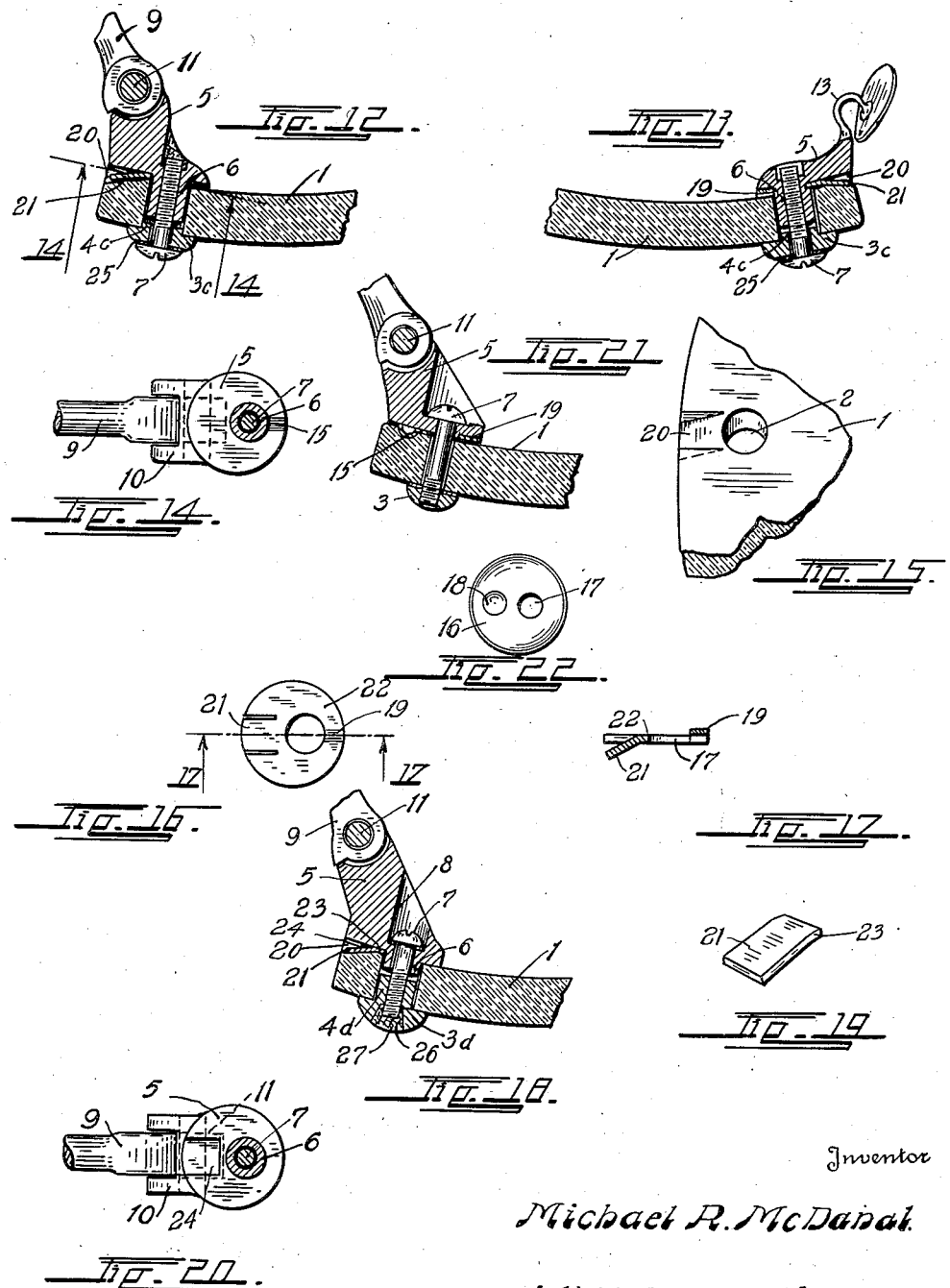

Patented June 4, 1935

2,004,005

UNITED STATES PATENT OFFICE 2,004,005

MOUNTING FOR RIMLESS SPECTACLES AND EYEGLASSES

Michael R. McDanal, Denver, Colo.

Application March 6, 1934, Serial No. 714,237

4 Claims. (Cl. 88—47)

This invention relates to certain improvements in spectacles and eyeglasses, and particularly to improvements in mountings for rimless spectacles and eyeglasses, and has for an object to provide a mounting structure which shall be firmly secured to the lens and locked against rocking and rotation relative to the lens.

A further object is to provide a mounting of the class described which shall so equalize and distribute the pressures, strains and stresses in and upon the lens resulting from the attachment of the mounting thereto as to greatly reduce the danger of breakage of the lens from the attachment of the mounting and from subsequent use thereof.

A further object of the invention is to provide, in a mounting of the class described, for use of a resilient element for lessening the rigidity of the attachment of the mounting to the lens and thereby lessening the danger of breakage of the lens.

Further objects are to provide a mounting of the class described which shall be compact, efficient, simple in construction and in attachment, readily adjustable, which shall reduce the danger of breakage and which shall be simple, neat and attractive in appearance.

Further objects will appear in the following specification and be defined in the appended claims, both specification and claims being taken in connection with the accompanying drawings, which are presented for illustration and not definition of the invention and in which like characters of reference indicate corresponding parts throughout and in which—

Fig. 1 is a front view of a pair of spectacles embodying the present invention.

Fig. 2 is a section on line 2—2 of Fig. 1.

Fig. 3 is a section on line 3—3 of Fig. 1.

Fig. 4 is a bottom view of the back piece showing the boss and screw in section on line 4—4 of Fig. 2.

Fig. 5 is a detail view of the lock washer.

Fig. 6 is a section of the lock washer on line 6—6 of Fig. 5.

Fig. 7 is a fragment of the lens showing the aperture for attachment of the mounting and one form of the lens-contained element of the locking combination.

Fig. 8 is a view similar to Fig. 4 but illustrating a modification of portions of the structure for accomplishing the locking of the mounting against rotation.

Fig. 9 is a fragment of a lens with an aperture formed to accommodate the embodiment illustrated in Fig. 8.

Fig. 10 is a view like Fig. 4 but showing another form of locking elements.

Fig. 11 is a fragment of a lens with aperture formed for accommodation of the structure illustrated in Fig. 10.

Fig. 12 is a view of temple mounting taken on the same line as Fig. 2 but showing another modification.

Fig. 13 is a view of bridge mounting taken on the same line as Fig. 3 but illustrating the same modification as Fig. 12.

Fig. 14 is a bottom view of the back piece shown in Fig. 12 and showing a cross section of the boss and screw on line 14—14 of Fig. 12.

Fig. 15 is a fragment of a lens showing the aperture for attachment of the mounting and the lens-contained element of the locking combination in the modification illustrated in Figs. 12 and 13.

Fig. 16 is a detail of the lock washer used in the modification illustrated in Figs. 12 and 13.

Fig. 17 is a section on line 17—17 of Fig. 16.

Fig. 18 is a view taken on the same line as Figs. 2 and 12 but illustrating a further modification with reference to the locking elements.

Fig. 19 is a detail view of a locking element used in the structure illustrated in Fig. 18.

Fig. 20 is a view of the bottom of the back piece in the embodiment illustrated in Fig. 18 showing the boss and screw in section, at the base line of said back piece.

Fig. 21 is a view like Fig. 2 but with structure modified.

Fig. 22 illustrates a modified washer.

All figures except Fig. 1 are enlarged.

In the drawings I have illustrated a pair of spectacles. It will be understood that in the use of the invention on eyeglasses the temples and temple mountings are omitted and the structure illustrated and hereafter described is used only for the bridge and nose piece mountings.

Each mounting includes a member engaging the front of the lens, called the front piece, and a member engaging the rear face of the lens, called the back piece, provision for securing the front piece to the back piece by means extending into or through said aperture and provision for engagement between the lens and the back piece to prevent interrelative rotation. Each back piece includes attachment, or provision for attachment, of the temple or bridge and nose piece as the case may be.

For each mounting, the lens 1 has an aperture

2. A front piece 3 is provided, larger than the aperture 2 but preferably with a hollow boss 4 adapted to fit into the aperture 2. The back piece 5 is likewise larger than the aperture 2 and preferably is also provided with a hollow boss 6 adapted to fit into the aperture 2 in alignment with boss 4. When bosses 4 and 6 are in the aperture 2 the front piece and back piece are drawn into and held in the desired position by a screw the head of which engages one of said pieces and threads into the opposite piece or its boss as, for example, in the embodiment illustrated in Figs. 1 to 11 and 18 to 20 in which embodiments the head of the screw 7 is in a countersink 8 in the back piece and the screw extends through the boss 6 and threads into the boss 4.

The back piece 5 which is used at the outer edge of the lens is provided with suitable means for attachment of the temple 9 which may be in the form of ears 10 to which the temple is pivotally attached as by pin 11 all as shown in Figs. 2, 4, 8, 10, 12, 14, 18 and 20.

The back piece 5 which is used at the inner edge of the lens is formed integral with the bridge 12 or attached thereto in any suitable manner as indicated in Fig. 1 and also carries a nose piece 13 mounted on the back piece 5 in any suitable manner or formed integral therewith as illustrated in Figs. 3 and 13. The particular form of back piece for providing attachment of the temples, bridge and nose pieces constitutes no part of the present invention.

The means for preventing interrelative rotation of the back piece and lens will now be described and while this is accomplished by embodiments of the invention varying in detail of structure, in each case it is accomplished by interengagement between the back piece and some part of the lens within its external contour, so that the edge of the lens is relieved of stress, strain and pressure.

In the embodiment illustrated in Figs. 2 to 7 there is provided a depression 14 in the rear face of the lens near the aperture 2 and in the bottom face of the back piece 5 there are provided grooves or depressions 15. For engagement with both the lens and back piece 5 there is provided a lock washer 16 having an aperture 17 for the boss 6, a projection 18 adapted to comate with depression 14, and ridges 19 adapted to comate with grooves 15, whereby, when the washer 16 is in engagement with the back piece 5 and with lens 1, in manner above indicated, and back and front pieces are drawn together by screw 7 as illustrated at Figs. 2 and 3, rotation of the back piece 5 relative to lens 1 will be prevented.

It will be noted that the depression 14, the walls of which have to withstand whatever force tends to rotate the mounting relative to the lens, does not extend through the lens and, moreover, that it is surrounded by lens material of full thickness and, therefore, of full strength. This embodiment therefore greatly reduces the danger of cracking the lens as a result of the exertion of any such rotative force.

Simplified structures for preventing rotation of the back piece relative to the lens are illustrated in Figs. 8, 9, 10 and 11 in which the boss 6 and aperture 2 are elongated either uniformly as in Figs. 8 and 9, or irregularly as by a lug 6a and comating recess 2a in the wall of the aperture 2, as illustrated in Figs. 10 and 11. These forms have the advantage of simplicity in eliminating the washer 16, the depression 14 and grooves 15 but may not lessen the danger of cracking the lens as much as the embodiment illustrated in Figs. 2 to 7.

The washer 16 may be constructed of resilient material in order to modify the rigidity of the engagement of back piece 5 with lens 1. Further modification of the rigidity of this connection may be had by using the modified structures illustrated in Figs. 12 to 20 in which the lens is provided with a tapered slot 20 for the accommodation of spring tongue 21 which may be provided as a part of a lock washer 22, shown in detail at Figs. 16 and 17, which washer is also provided with a ridge 19 adapted to comate with a groove 15 in back piece 5. Further, the washer may be slightly cupped as illustrated at Fig. 22 in order to provide further resilience to the interconnection of lens and back piece.

In place of the washer 22 the spring tongue 21 may be provided with a base 23 adapted to rest in a slot 24 in the base of back piece 5, whereby the tongue 21 in slot 20 of the lens with its base 23 in slot 24 of back piece 5 will prevent interrelative rotation of the lens and back piece.

It will be understood that in the embodiments illustrated in Figs. 12 to 20 the tongue 21 is normally depressed more than the slant of the floor of slot 20 so that when the parts are drawn together by screw 7 the tongue 21 will resiliently press upon the floor of slot 20 thereby providing resilience in the interengagement of the lens and back piece.

In Figs. 12, 13 and 18 there is also illustrated a modified structure and arrangement of screw 7 and associated parts. In Figs. 12 and 13 the front piece 3c is hollow and provided with a hollow boss 4c and the screw 7 has its head upon the front piece 3c, a washer 25 being provided, and the shank of screw 7 projecting through front piece 3c, boss 4c and threading into boss 6 and back piece 5.

In Fig. 18 the front piece 3d is illustrated as provided with a countersink 26, the screw 7 is positioned as in Fig. 2 but is longer and projects into the countersink and the countersink is filled with a cementitious plug 27 for engaging and locking the screw and for filling the countersink and providing a suitable surface on the front piece.

In Fig. 21 there is illustrated a simplified embodiment of the invention wherein the bosses 4 and 6 are eliminated, the aperture 2 is preferably made just large enough for the accommodation of the shank of screw 7 which screw heads in back piece 5 and threads directly into front piece 3.

While I have illustrated a number of modifications of details of structure, other changes, which will occur to those skilled in the art, may be made within the spirit and scope of the invention as above described and as illustrated in the drawings and within the definition of the invention as contained in the appended claims, and I do not wish to be confined to the details described or illustrated.

I claim—

1. A mounting for rimless spectacles and the like comprising, in combination, a lens, a front piece and a back piece adapted to engage respectively the front and rear faces of the lens, an aperture in the lens, an indentation in the rear face of the lens entirely within its periphery and entirely without said aperture, an indentation on the inner face of the back piece and a member positioned between the back piece and the lens and adapted to engage the indentations in the lens and back piece to prevent interrelative rotation of the back piece and the lens and means, operable through said aperture for drawing the front and back pieces toward each other whereby to interlock the elements of the combination.

2. A mounting for rimless spectacles and the like comprising, in combination, a lens, a front piece and a back piece adapted to engage respectively the front and rear faces of the lens, an aperture in the lens, a resilient lock washer between the back piece and the lens said lock washer, back piece and rear face of lens having co-mating indentations and projections to prevent interrelative rotation of the back piece and the lens and means, operable through said aperture for drawing the front and back pieces toward each other whereby to interlock the elements of the combination.

3. A mounting for rimless spectacles and the like comprising, in combination, a lens, a front piece and a back piece adapted to engage respectively the front and rear faces of the lens, an aperture in the lens, depressions in the opposing faces of the lens and back piece, a resilient member adapted to interengage said depressions to prevent interrelative rotation of the back piece and the lens and means, operable through said aperture for drawing the front and back pieces toward each other whereby to interlock the elements of the combination.

4. A mounting for rimless spectacles and the like comprising, in combination, a lens, a front piece and a back piece adapted to engage respectively the front and rear faces of the lens, an aperture in the lens, a depression in the rear face of the lens, a depression in the base of the back piece, a resilient member adapted to seat partly in each of said depressions to prevent interrelative rotation of the back piece and the lens and means, operable through said aperture for drawing the front and back pieces toward each other whereby to interlock the elements of the combination.

MICHAEL R. McDANAL.